US008569701B2

(12) United States Patent
Reda

(10) Patent No.: US 8,569,701 B2
(45) Date of Patent: Oct. 29, 2013

(54) ABSOLUTE CAVITY PYRGEOMETER

(75) Inventor: Ibrahim Reda, Aurora, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 300 days.

(21) Appl. No.: 13/049,275

(22) Filed: Mar. 16, 2011

(65) Prior Publication Data

US 2012/0235041 A1    Sep. 20, 2012

(51) Int. Cl.
*G01J 5/02*      (2006.01)
(52) U.S. Cl.
USPC ........................................................ 250/353
(58) Field of Classification Search
USPC ........................................................ 250/353
See application file for complete search history.

(56) References Cited

U.S. PATENT DOCUMENTS 1,891,039 A * 12/1932 Barton .......................... 136/214
5,741,068 A * 4/1998 Hemmerich et al. ............ 374/31

FOREIGN PATENT DOCUMENTS

EP           0225907 B1    12/1989

OTHER PUBLICATIONS

Michalsky, J., "Traceability of Solar Radiation measurements and Related Matters/Activitiese," World Meteorological Organization, CIMO Expert Team on Meterologicl Radiation and Atmospheric Composition Measurements, Second Session, Sep. 14-18, 2009, Switzerland.
Philopona, R., et al, Pyrgeometer Absolute Calibration and the Quest for a World Radiometric Reference for Longwave Irradiance Measurements, IRS 2000: Current Problems in Atmospheric Radiation, A. Deepak, Hampton, Va., Jul. 2000, Russia.
Reda, I., et al, "Pyrgeometer Calibration at the National Renewable Energy Laboratory (NREL)," Journal of Atmospheric and Solar-Terrestrial Physics, 64 (15), Oct. 2002, pp. 1623-1629.
Philipona, R., et al, "Atmospheric Longwave Irradiance Uncertainty: Pyrgeometers Compared to an Absolute Sky-Scanning Radiometer, Atmospheric Emitted Radiance Interferometer, and Radiative Transfer Model Calculations," Journal of Geophysical Research, 106 (D22), Nov. 27, 2001, pp. 28,129-28,141.
Reda, I., et al, "Improvements in the Blackbody Calibration of Pyrgeometers," NREL Report No. PR-560-45868, Presented at the 18th Atmospheric Radiation Measurement (ARM) Program Science Team Meeting; Mar. 2008.
Reda, I., et al, "Prygeometer Calibration for DOE-Atmospheric System Research Program Using NREL Method," NREL Report No. PR-3B0-47756, Presented at the DOE-Atmospheric System Research Program, Science Team Meeting, Mar. 2010.

(Continued)

*Primary Examiner* — David Porta
*Assistant Examiner* — Hugh H Maupin
(74) *Attorney, Agent, or Firm* — Paul J. White; J. Patrick Kendrick

(57) ABSTRACT

Implementations of the present disclosure involve an apparatus and method to measure the long-wave irradiance of the atmosphere or long-wave source. The apparatus may involve a thermopile, a concentrator and temperature controller. The incoming long-wave irradiance may be reflected from the concentrator to a thermopile receiver located at the bottom of the concentrator to receive the reflected long-wave irradiance. In addition, the thermopile may be thermally connected to a temperature controller to control the device temperature. Through use of the apparatus, the long-wave irradiance of the atmosphere may be calculated from several measurements provided by the apparatus. In addition, the apparatus may provide an international standard of pyrgeometers' calibration that is traceable back to the International System of Units (SI) rather than to a blackbody atmospheric simulator.

18 Claims, 6 Drawing Sheets

(56) References Cited

OTHER PUBLICATIONS

Reda, I., et al, "Calibrating Pyrgeometers Outdoors Independent from the Reference Value of the Atmospheric Longwave Irradiance," Journal of Atmospheric and Solar-Terrestrial Physics, 68 (12) Aug. 2006 pp. 1416-1424.

Michalsky, J., "Campaign: International Pyrgeometer Intercomparison," U.S. DOE, Office of Science, Sep. 1999, http://www.arm.gov/campaigns/sgp1999ipi, accessed Jun. 10, 2013.

* cited by examiner

ABSOLUTE CAVITY PYRGEOMETER

CONTRACTUAL ORIGIN

The United States Government has rights in this invention under Contract No. DE-AC36-08G028308 between the United States Department of Energy and the Alliance for Sustainable Energy, LLC, manager and operator of the National Renewable Energy Laboratory.

BACKGROUND

Long-wave irradiance from the atmosphere may be measured in renewable energy applications, meterological and climatological studies to determine the amount of infrared radiation, both direct and indirect, reaching the Earth's surface, changes in long term climate, etc. To measure the long-wave irradiance, a pyrgeometer is typically used. Pyrgeometers are devices that measure the atmospheric infra-red radiation spectrum that extends approximately from 4.5 micrometers to 100 micrometers. In general, pyrgeometers comprise a thermopile sensor that converts thermal energy caused by absorbed radiation into electrical energy. Typically, the thermopile is located under a filtered silicon dome or window that acts as a short-wave filter such that only the long-wave radiance reaches the thermopile. Thus, by measuring the voltage generated by the thermopile, the long-wave radiance of the atmosphere may be determined.

To accurately measure the long-wave irradiance of the atmosphere, pyrgeometers are typically calibrated to an international standard. In general, manufacturers of pyrgeometers calibrate the pyrgeometers by obtaining a pyrgeometer that has been compared to and calibrated to an internationally recognized reference. Thus, each manufactured pyrgeometer has traceability back to a world standard. However, to date, the international pyrgeometer standard is based on a calculation obtained from an artificial atmosphere created in a blackbody device. In general, the blackbody device utilizes a viscous material to create long-wave irradiance within an enclosed dome under specific constraints that is then measured by a thermopile device. Through this measurement, several coefficients of the blackbody device may then be computed and, subsequently, used to calibrate additional pyrgeometers. In this manner, pyrgeometers from around the world may be calibrated to an international standard based on the blackbody device to normalize the measurements obtained from the pyrgeometers.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

At present, the blackbody standard is the only international standard reference for calibrating pyrgeometers. However, because this standard is based on an artificial atmosphere with long-wave irradiance created by the blackbody device, the standard is not traceable back to the International System of Units (SI). In other words, the blackbody standard is not an absolute reference based on naturally occurring irradiance, but is instead based on an artificially created atmosphere.

One implementation of the present disclosure may take the form of an apparatus for measuring atmospheric long-wave irradiance. The apparatus may involve a concentrator that includes a first aperture at a first region of the concentrator, a second aperture at a second region of the concentrator and a parabolic-shaped chamber with a reflective surface. Further, the first aperture may be configured to allow atmospheric long-wave irradiance to enter the chamber such that the reflective surface of the chamber reflects long-wave irradiance toward the second aperture of the concentrator. The apparatus may also include a thermopile positioned at the second aperture of the concentrator such that at least some of the reflected atmospheric long-wave irradiance strikes the thermopile receiving surface. In addition, the apparatus may include a thermal mass in thermal communication with the thermopile.

Another implementation of the present disclosure may take the form of a method for measuring the absolute atmospheric long-wave irradiance. The method may involve the operations of orienting an absolute cavity pyrgeometer to receive and measure atmospheric long-wave irradiance, where the absolute cavity pyrgeometer comprising at least a concentrator, a thermopile and a temperature controller in thermal communication with the thermopile. The method may also include cooling the thermopile by utilizing the temperature controller, one or more measurements from the absolute cavity pyrgeometer, calculating the sensitivity of the thermopile from the one or more measurements from the absolute cavity pyrgeometer and calculating the atmospheric long-wave irradiance from the one or more measurements from the absolute cavity pyrgeometer and the calculated sensitivity of the thermopile.

Yet another implementation of the present disclosure may take the form of a system for measuring absolute atmospheric long-wave irradiance. The system may involve a computing device comprising a processor and a computer-readable medium and an absolute cavity pyrgeometer. In addition, the absolute cavity pyrgeometer may include a thermopile configured to detect atmospheric long-wave irradiance and output a voltage related to the detected atmospheric long-wave irradiance to the computer-readable medium of the computing device, a concentrator configured to reflect atmospheric long-wave irradiance to the surface of the thermopile and a temperature controller in thermal communication with the thermopile configured to control the temperature of at least one surface of the thermopile.

BRIEF DESCRIPTION OF THE DRAWINGS

In addition to the exemplary aspects and embodiments described above, further aspects and embodiments will become apparent by reference to the drawings and by study of the following descriptions.

Exemplary embodiments are illustrated in referenced figures of the drawings. It is intended that the embodiments and figures disclosed herein are to be considered illustrative rather than limiting.

DETAILED DESCRIPTION

Implementations of the present disclosure involve an apparatus to measure long-wave irradiance of the atmosphere. The apparatus may involve a thermopile, a gold-plated concentrator and temperature controller. The concentrator may further involve a polished gold surface and have an inner compound parabolic shape formed to reflect incoming long-wave irradiance from 180 degrees of the atmospheric sky. The incoming long-wave irradiance is directed by the concentrator to a thermopile receiver located at the bottom of the concentrator to receive and measure the reflected long-wave irradiance. In addition, the thermopile may be thermally connected to a temperature controller to control the temperature of the device during collection of the long-wave irradiance. Through use of the apparatus, the long-wave irradiance of the atmosphere may be calculated from several measurements provided by the apparatus. In addition, the apparatus may provide an international standard of pyrgeometers' calibration that is traceable back to the International System of Units (SI) rather than to an artificial blackbody atmospheric simulator.

Another implementation of the present disclosure involves a method for utilizing an absolute cavity pyrgeometer device to measure long-wave irradiance of the atmosphere. One such pyrgeometer is described herein with reference to FIGS. 1 through 3. The method may include the operations of orienting the pyrgeometer to receive long-wave irradiance from the atmosphere and lowering the pyrgeometer's case temperature utilizing a temperature controller during operation of the pyrgeometer device. In addition, the method may include utilizing the measured data to calculate the sensitivity of the device and the long-wave irradiance obtained by the device. In one embodiment, the sensitivity of the device may be calculated from the rate of change of the output thermopile voltage of the pyrgeometer versus the changing measured irradiance to determine the sensitivity of the thermopile. In this manner, the method may utilize the pyrgeometer to calculate the absolute atmospheric long-wave irradiance with a traceability to SI units.

Figure 1:
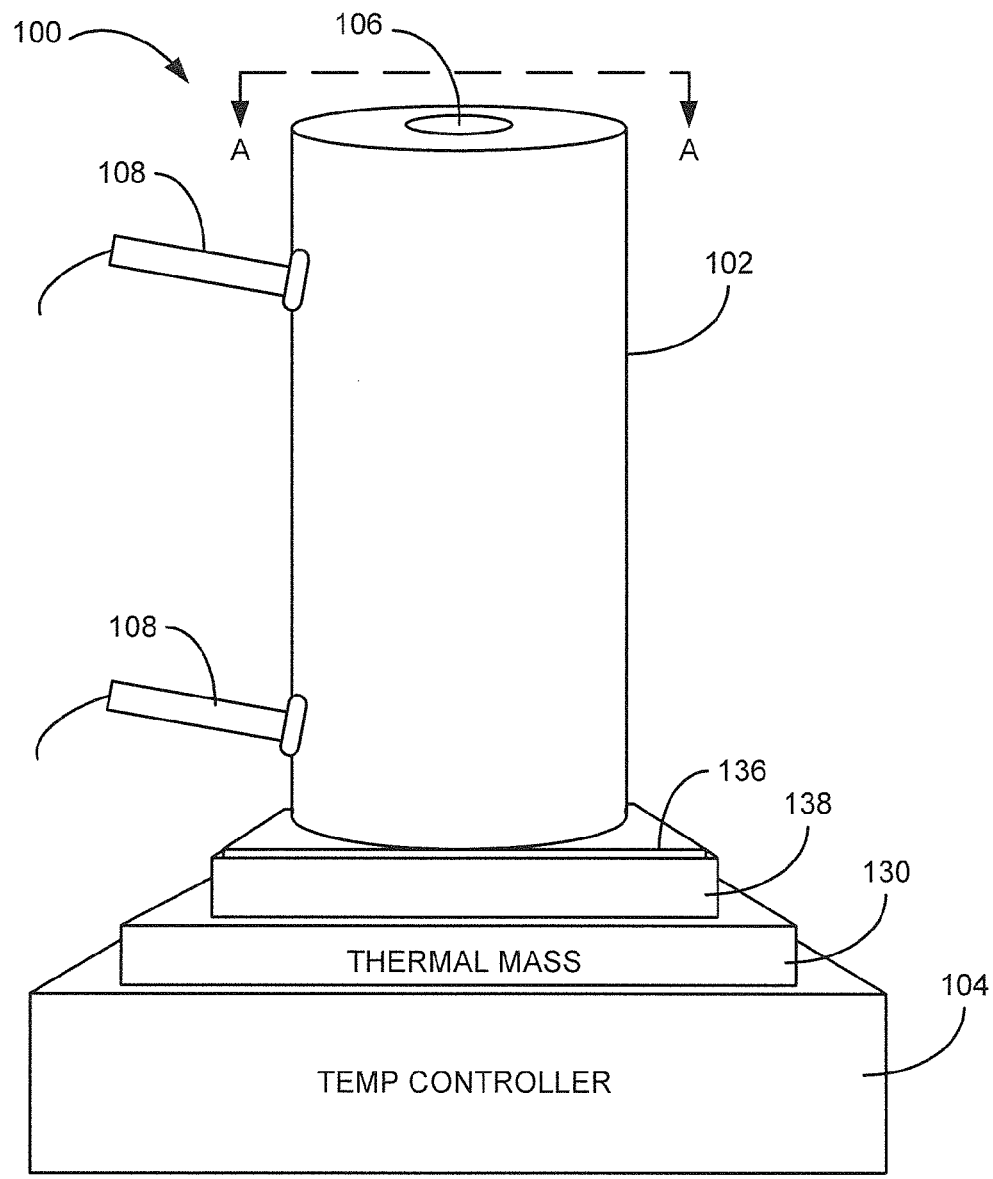
FIG. 1 is a diagram illustrating an isometric view of an absolute cavity pyrgeometer to measure the long-wave irradiance of the atmosphere.
Figure 2:
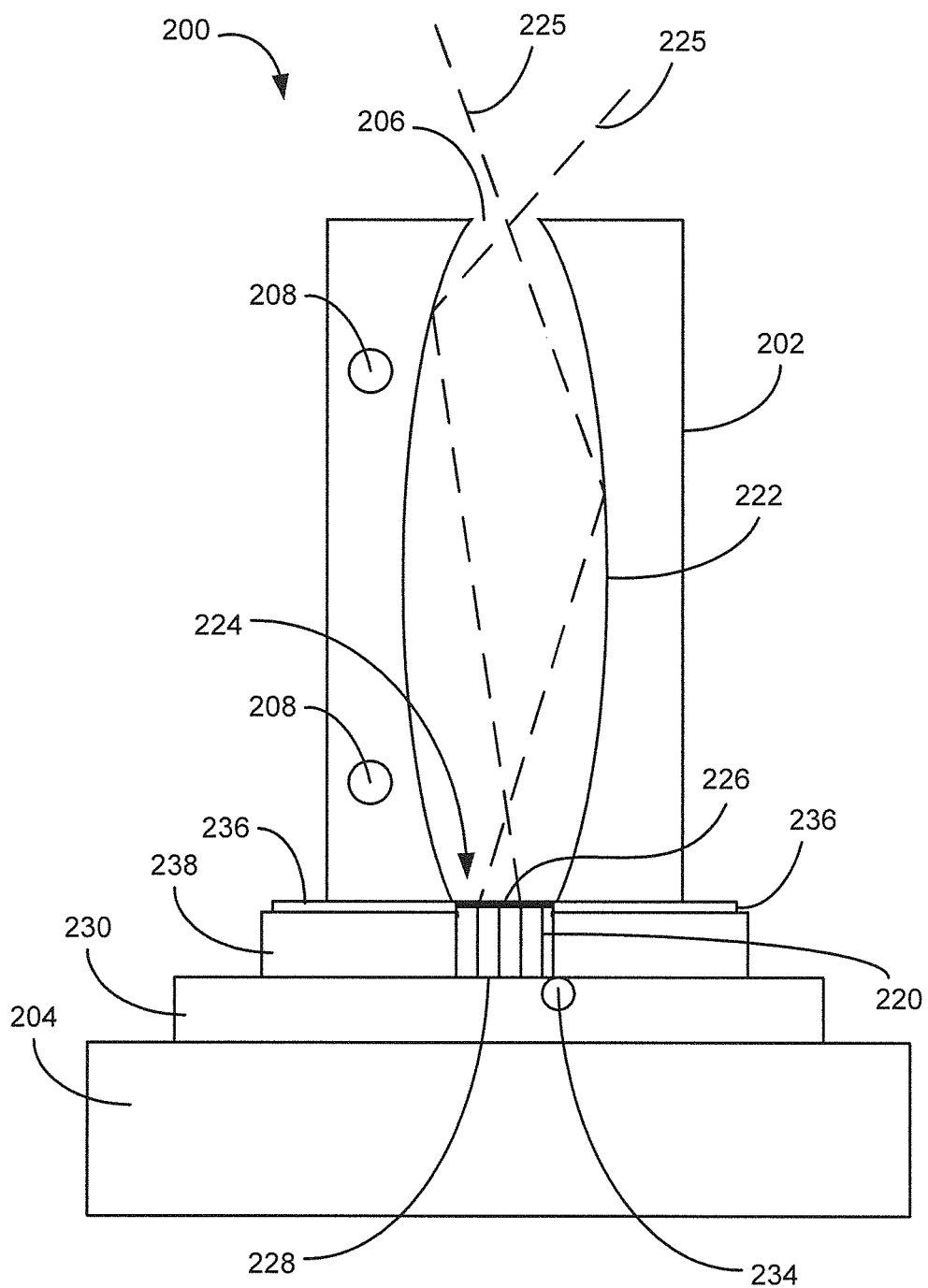
FIG. 2 is a diagram illustrating a cross-sectional view of the absolute cavity pyrgeometer of FIG. 1 along line A-A.

As mentioned above, a pyrgeometer device may be utilized to measure long-wave irradiance of the atmosphere for several types of renewable energy applications, meterological and climatological studies. FIG. 1 is a diagram illustrating an isometric view of an absolute cavity pyrgeometer, according to one possible implementation, that may be used to measure the long-wave irradiance of the atmosphere. FIG. 2 is a diagram illustrating a cross-sectional view of the absolute cavity pyrgeometer of FIG. 1. The device of FIGS. 1 and 2 can be used to measure the absolute long-wave irradiance of the atmosphere and, in addition, provide an absolute international reference that may be used to calibrate pyrgeometer devices. The description of the absolute cavity pyrgeometer provided below is in reference to both FIGS. 1 and 2 and indicator numbers of FIG. 1 correspond to similar indicator numbers of FIG. 2. For example, the concentrator 102 of FIG. 1 is the same concentrator 202 of FIG. 2.

To aid in measuring the long-wave irradiance of the atmosphere, the pyrgeometer device 100 includes a concentrator 102 configured to direct atmospheric long-wave irradiance to a thermopile detector located at an end of the concentrator opposite an aperture 106 that allows in irradiance. As shown in the embodiment of FIG. 1, the outer surface of the concentrator 102 may be cylindrical in shape with the irradiance receiving aperture 106 at one end of the concentrator. In one specific example, the irradiance receiving aperture 106 and concentrator 102 are configured to allow irradiance of 180 degrees from the atmosphere to enter into an inner portion 226 of the concentrator. Stated differently, atmospheric irradiance, both direct and indirect, from all directions around the pyrgeometer may enter the concentrator 202. Also, as shown in FIG. 2, the inner portion 226 of the concentrator 202 may define a compound concave parabolic-shaped inner surface 222 extending from the irradiance receiving aperture 206 to an aperture 224 that includes the thermopile 220. The inner compound parabolic-shaped surface provides a reflecting chamber within the concentrator. The compound parabolic shape reflects incoming irradiance from the irradiance receiving aperture 206 towards the bottom aperture 224. In one example, the shape and angle of the inner surface 222 is such that, most of the time, the long-wave irradiance is reflected one time within the concentrator before reaching the thermopile 220. In addition, to facilitate reflecting the incoming irradiance to the bottom aperture 224 of the concentrator 202, the inner surface 222 of the concentrator may be highly polished or composed of, coated or plated with a reflective material for the long-wave irradiance. For example, in one embodiment, the concentrator 202 is plated or otherwise coated with gold to reflect the incoming irradiance toward the thermopile 220. In addition, the outer surface of the concentrator 202 may also be highly polished or composed of, coated or plated with a reflective material to reflect the long-wave irradiance of the atmosphere. In general, the reflective outer surface of the concentrator may reduce the amount of long-wave irradiance passing through the walls of the concentrator 202 and being detected by the thermopile 220.

During irradiance detection by the device 200, the concentrator 202 may be installed or oriented such that the irradiance receiving aperture 206 points generally towards the sky, or another type of infrared source. As shown in FIG. 2, the long-wave irradiance 226 may enter the concentrator 202 through the irradiance receiving aperture 206. Some of the entering irradiance 226 may enter the concentrator 202 at an angle such that the irradiance strikes the inner surface 222 of the concentrator and is reflected generally down to the bottom aperture 224 of the concentrator. As mentioned above, the angle of the inner surface 222 may reflect the incoming irradiance toward the bottom aperture 224 in such a way as to minimize the number of reflections encountered by the irradiance. However, it should be appreciated that the long-wave irradiance may experience any number of reflections or not reflected at all within the reflective chamber of the concentrator 202 before striking the thermopile 220. Also, as explained in more detail below, the long-wave irradiance 206 may be detected and measured by the thermopile 220 located at the bottom aperture 224 of the concentrator 202.

Returning to FIG. 1, one or more temperature sensors 108 may be associated with the concentrator 102 to measure the temperature of the concentrator during measurement of the long-wave irradiance or operation of the device. In one embodiment, the one or more temperature sensors 108 may be at least partially inserted into the body of the concentrator 102 such that the temperature of the body of the concentrator may be measured. Further, the one or more temperature sensors 108 may be a thermistor device that measures resistance as a function of temperature to determine the temperature of the concentrator 102. However, it should be appreciated that any type of temperature sensor may be used to measure the temperature of the concentrator 102 during operation. In addition, the pyrgeometer 100 may include any number of temperature sensors 108. For example, in one embodiment, six temperature sensors 108 may be installed in the body of the concentrator 102, three located in the upper half of the concentrator and three in the lower half, each with 120 degree angular distance on the perimeter of the concentrator. It should be appreciated, however, that any number and type of temperature sensors 108 may be installed on the body of the concentrator 102 in any pattern such that the temperature of the concentrator may be determined.

Returning to FIG. 2, the pyrgeometer device 200 also includes the thermopile 220 located at or otherwise within the bottom aperture 224 of the concentrator 202 to detect the amount of long-wave irradiance 226 entering the reflective chamber of the device. In general, the thermopile 220 may be an electronic device that converts received thermal energy into electrical energy. However, any type of long-wave irradiance detector may be utilized with the pyrgeometer device 200. In the embodiment utilizing a thermopile 220, the thermopile voltage output generated by the presence of long-wave irradiance striking the thermopile surface is used, directly or indirectly, to determine the net long-wave irradiance detected at the surface, as explained in more detail below. In general, the thermopile 220 may include a receiving surface 226 adjacent to the aperture 224 of the concentrator. In some embodiments; the receiving surface 226 may be painted, or otherwise colored, black to aid in the absorption of the broadband spectrum from the incoming long-wave irradiance 225. Additionally, the surface opposite the receiving surface 226 of the thermopile 220 may include one or more reference junctions 228 configured to provide the voltage from the detected long-wave irradiance at the thermopile 220.

Figure 3:
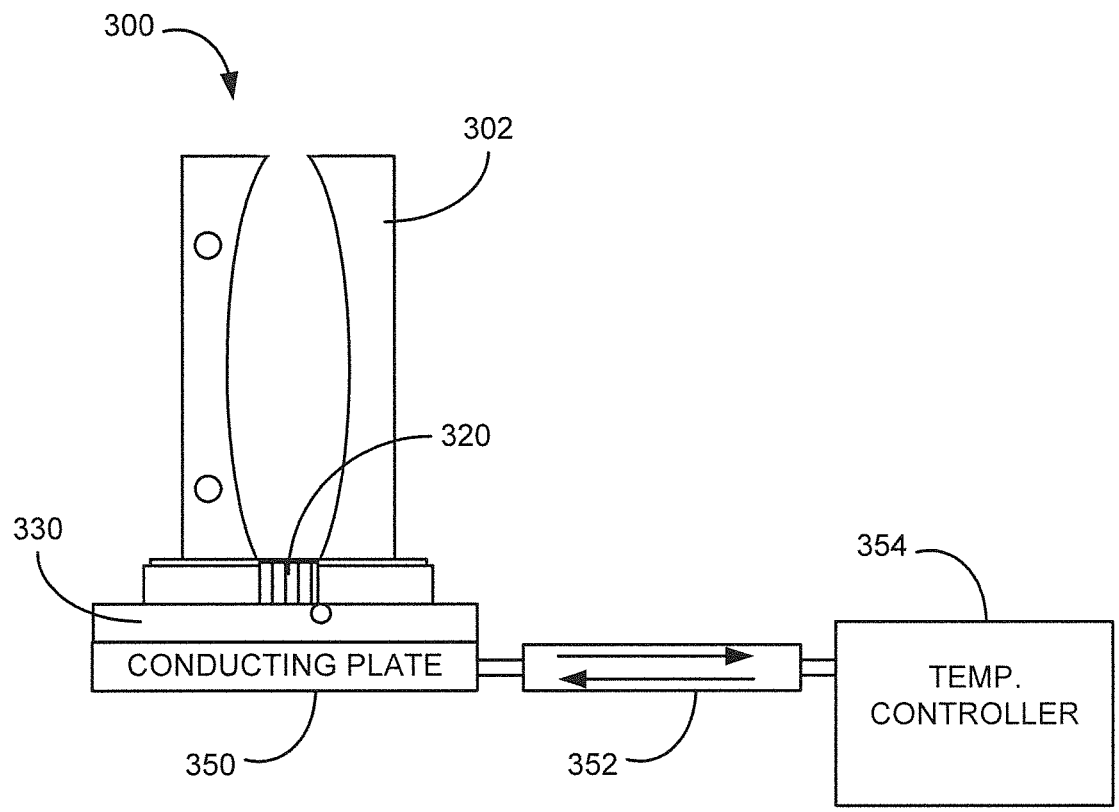
FIG. 3 is a diagram illustrating a cross-sectional view of an absolute cavity pyrgeometer to measure the long-wave irradiance of the atmosphere including a circulating fluid temperature controller.

As shown in FIG. 2, the reference junctions 228 of the thermopile 220 may be mounted on and thermally coupled to a thermal mass 230. The thermal mass 230 may be any material that conducts thermal energy. In one example, the thermal mass is composed of copper. However, the thermal mass may be any material that conducts thermal energy to the thermopile. In addition, the thermal mass 230 may be thermally connected to a temperature controller 204. In general, the temperature controller 204 is configured to regulate the temperature of the thermal mass 230 and, thereby, the reference junctions 228 of the thermopile 220. One embodiment of a temperature controller 204 is shown in FIG. 3 and discussed in more detail below. However, the temperature controller 204 may be any device that regulates the temperature of the thermal mass 230 and the reference junctions 228 of the thermopile 220. Further, a temperature sensor 234, such as a thermistor similar to that described above, may also be associated with the thermal mass 230, located adjacent to and in thermal contact with the reference junctions 228 of the thermopile 220. The thermal mass temperature sensor 234 may provide a reference temperature for the thermopile 220 of the pyrgeometer device 200, which may be used when calculating the long-wave irradiance 225 of the atmosphere, as described below.

In addition, the temperature controller 232 may operate to regulate or control the temperature of the thermal mass 230. To prevent the temperature regulation of the thermal mass 230 from unexpectedly affecting the concentrator 202, an insulator 236 may be located between the concentrator 202 and the thermal mass 230. The insulator 236 may eliminate or reduce thermal conduction between at least the concentrator 202 and rest of the pyrgeometer device 200. In some implementations, such as that shown in FIG. 2, the insulator 236 may be mounted on or formed on a spacer 238 that provides a cavity within the pyrgeometer device in which the thermopile 230 may be located. The spacer 238 may also further separate the concentrator 202 from the thermal mass 230 to provide an additional layer of thermal isolation. In other embodiments, the spacer 238 itself may form part of the insulator 236 such that the insulator forms the thermopile 220 cavity in the pyrgeometer device. In either event, the insulator 236 provides for the temperature of the thermal mass 230 and the reference junctions 228 of the thermopile 220 to be regulated while reducing any thermal conduction to the concentrator 202. Similarly, temperature fluctuations in the concentrator 202 may not be thermally conducted to the thermal mass 230 or the thermopile 220 such that the temperature of the thermal mass may be regulated accurately.

Through the use of the absolute cavity pyrgeometer device 200 described above, several measurements may be determined that aid in measuring the long-wave irradiance of the atmosphere. For example, the temperature sensors 208 of the concentrator 202 may measure the temperature change within the concentrator. For those embodiments that include a plurality of temperature sensors 208 within the concentrator 202, an average of some or all of the temperature sensors may be calculated to determine the concentrator temperature. In addition, the temperature sensor 234 in thermal communication with the reference junctions 228 of the thermopile 220 may also provide the temperature change at the reference junctions. The output voltage of the thermopile 220 may also be measured by the pyrgeometer device 200. These and other measurements may be utilized, as described below, to develop an absolute international standard for pyrgeometer calibration based in SI measurements.

As mentioned above, the absolute cavity pyrgeometer may include a temperature controller to regulate the temperature of the reference junctions of the thermopile. FIG. 3 is a diagram illustrating a cross-sectional view of an absolute cavity pyrgeometer 300 to measure the long-wave irradiance of the atmosphere including a circulating fluid temperature controller 354. The embodiment of FIG. 3 is but one implementation of a temperature controller for the pyrgeometer device 300. As should be appreciated, other devices and methods known to those of skill in the art may be utilized to regulate the temperature of various components of the pyrgeometer device 300.

In general, the pyrgeometer device 300 shown in FIG. 3 is the same or similar to the pyrgeometer device discussed above with reference to FIGS. 1 and 2. Thus, the pyrgeometer device 300 may include a concentrator 302, a thermopile 320 to measure the long-wave irradiance of the atmosphere and a thermal mass 330 in thermal communication with the thermopile to regulate the temperature of at least a portion of the thermopile. Also, in the embodiment shown, the pyrgeometer device 300 may sit atop or otherwise be in thermal communication with a conducting plate 350. In one implementation, the conducting plate 350 is a circular-shaped aluminum plate with two hoses (not shown) postitioned within the plate. The hoses may be configured to receive a flowing liquid at an intake port associated with the plate and return the flowing liquid at an outtake port. Connected to the intake and outtake port of the conducting plate 350 may be one or more connecting hoses 352 in fluid communication with the intake and outtake port of the plate at one end of the connecting hoses. At the opposite end, the connecting hoses 352 may be in fluid communication with a temperature controller 354 configured to cool and/or heat a fluid within the controller.

To control the temperature of the thermal mass 330 of the pyrgeometer device 300, a fluid may be circulated through the temperature controller 354, the one or more connecting hoses 352 and the conducting plate 350. In one embodiment, the fluid may be a mixture of water and a type of antifreeze chemical. However, in general, the temperature controller 354 system may utilize any type of viscous fluid that can be circulated through the connecting hoses 352 to the conducting plate 350. During circulation, the temperature controller 354 may cool or heat the fluid as it circulates through the controller. The cooled or heated fluid may then flow out of the temperature controller 354, through the one or more connecting hoses 352 and through the conducing plate 350, before returning along a similar path to the temperature controller 354. As the fluid circulates through the conducting plate 350, the plate may be cooled or heated respective to the temperature of the circulating fluid. In addition, the heating or cooling of the conducting plate 350 may then be thermally communicated to the thermal mass 330 of the pyrgeometer device 300. In this manner, the temperature controller 354 may control or regulate the temperature of the pyrgeometer device 300 for operation as described above.

Figure 4:
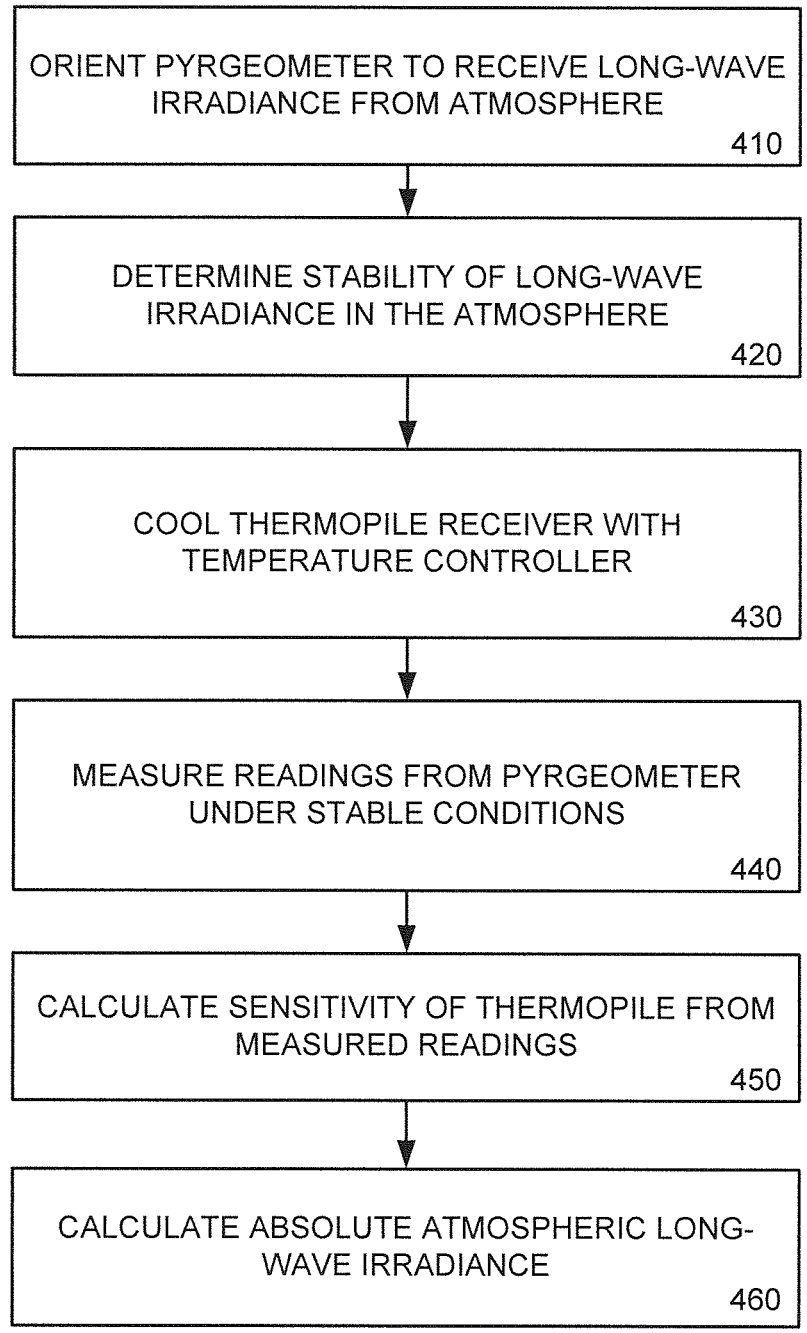
FIG. 4 is a flowchart of a method for utilizing the absolute cavity pyrgeometer to measure absolute atmospheric long-wave irradiance.

As mentioned above, the pyrgeometer device 300 disclosed herein may be utilized to measure the atmospheric long-wave irradiance. FIG. 4 is a flowchart of such a method for utilizing the absolute cavity pyrgeometer to measure absolute atmospheric long-wave irradiance. The operations of the method of FIG. 4 may be performed by an operator or by a computing device (described in greater detail below with reference to FIG. 6) configured to perform measuring of the atmospheric long-wave irradiance. In some embodiments, the operations of the method may be performed by a combination of an operator and a computing device. Thus, while the operations are described below with reference to an operator, the operations may be performed by any combination of the operator and/or computing device. In addition, it should be noted that the flowchart of FIG. 4 is illustrative only such that alternative embodiments of the present disclosure may add operations, omit operations, or change the order of operations without affecting the spirit and scope of the present application.

Beginning in operation 410, the operator may orient the pyrgeometer device in such a manner as to receive long-wave irradiance from the atmosphere or an infrared source. As described above, the pyrgeometer device may receive long-wave irradiance in 180 degrees from the atmosphere. In one embodiment, the pyrgeometer is oriented vertically in relation to the ground to receive the long-wave irradiance. In other embodiment, the pyrgeometer device may be oriented horizontally in relation to the ground. In general, however, the pyrgeometer device may be oriented at any angle to the ground to collect the long-wave irradiance from the atmosphere. Additionally, the pyrgeometer may be oriented outside at night so as to reduce the short-wave irradiance that could potentially interfere with the measurement of the long-wave irradiance.

In operation 420, the stability of the long-wave irradiance may be monitored by a long-wave detector during data collection. For example, as described in more detail below, the measurement of atmospheric long-wave irradiance measurements may become more accurate if the measurement of the long-wave irradiance by the pyrgeometer is conducted during periods of stable long-wave irradiance. Thus, the more stable the long-wave irradiance is during the measuring of the irradiance, the more accurate the measurements may become. In one embodiment, the long-wave detector may be a plurality of collocated pyrgeometers whose measured results may be combined to determine the relative stability of the long-wave irradiance. In general, however, the stability of the long-wave irradiance may be monitored by any long-wave detector device. Further, it should be noted that the long-wave detector device utilized is not required to determine the long-wave irradiance in the atmosphere, but is utilized instead to determine the relative stability of the long-wave irradiance during the use of the pyrgeometer device.

In operation 430, the temperature controller may be utilized to adjust or cool down the thermal mass and thermopile reference junctions. In the embodiment described above with reference to FIG. 3, the temperature controller may cool the thermal mass by circulating a cool fluid through a conducting plate in thermal communication with the thermal mass. In one example, the thermal mass may be cooled to at least 5 degrees Celsius lower than the stable ambient temperature around the pyrgeometer. As explained in more detail below, by lowering the temperature of the thermopile, the outgoing long-wave irradiance from the thermopile may be controlled or reduced to aid in the calculation of the long-wave irradiance of the atmosphere.

Once the long-wave irradiance is determined to be stable in operation 420 and the thermal mass is cooled in operation 430, one or more measurements from the pyrgeometer device may be taken in operation 440. In some embodiments, the measurements may include the voltage from the thermopile, the temperature of the concentrator from the one or more thermistors connected to the concentrator and/or the temperature of the reference junctions of the thermopile. These measurements may be obtained and stored by the computing device for a particular amount of time sufficient to provide data to calculate the incoming long-wave irradiance. In one example, the measurements may be obtained from the pyrgeometer device every 10 seconds for at least seven minutes of stable conditions. In addition, the obtained measurements from the pyrgeometer device may be stored in a computer-readable medium of a computing device, as described in more detail below. Once obtained, the data may be analyzed by the operator or computing device to calculate one or more atmospheric conditions, such as the long-wave irradiance of the atmosphere, as described below in operation 450 and operation 460.

For example, in operation 450, the measured data obtained in operation 440 from the pyrgeometer device may be analyzed to calculate the sensitivity of the thermopile of the pyrgeometer. In general, the sensitivity of the thermopile may be calculated from the change in the temperature of the thermopile and the change in voltage output of the thermopile. Calculating the sensitivity of the thermopile is described in more detail below. However, once the sensitivity of the thermopile is determined, that sensitivity figure may be used in operation 460, along with the measurements obtained from the pyrgeometer device, to calculate the atmospheric long-wave irradiance. The calculation of the long-wave radiance from the readings of the pyrgeometer device is also provided in more detail below. It should be noted, however, that the long-wave irradiance calculation obtained in operation 460 does not require that the pyrgeometer be calibrated to the blackbody international standard. Rather, the pyrgeometer device and method described herein may provide an alternative standard with traceability to the International System of Units.

As mentioned, the various measurements provided by the pyrgeometer device may enable the calculation of several aspects of the device and the atmosphere. In general, the measurements may provide for the calculation of the sensitivity of the thermopile (operation 450 above) and the long-wave irradiance of the atmosphere (operation 460 above). More particularly, Equation 1 may generally be used to calculate the incoming irradiance measured at the pyrgeometer's receiver. It is typically used to measure the atmospheric irradiance using a pyrgeometer with a dome.

$$W_{atm} = K_0 + K_1 * V_{tp} + K_2 * W_r - K_3 * (W_d - W_r) \quad (1)$$

where,
- $W_{atm}$ is the incoming atmospheric long-wave irradiance, in $W.m^{-2}$
- $K_0$ is a constant, and its value will vary based on the non-ideal calibration process when a blackbody is used to calibrate pyrgeometers. It is equal to zero for non-blackbody calibrations
- $V_{tp}$ is the thermopile output voltage, in uV (microvolt)
- $K_1$ is the reciprocal of the thermopile responsivity, in $W.m^{-2}.uV^{-1}$
- $K_2$ is the emittance of the thermopile receiver surface, and also accounts for most of the errors in calculating the receiver temperature using a non calibrated thermistor
- $K_3$ is the thermal conduction between the dome and receiver; also accounts for most of the dome's transmittance and emittance of the dome and receiver, and the calculated dome and receiver temperatures using non calibrated thermistors
- $W_d$ is the pyrgeometer's dome irradiance, in $W.m^{-2}$ $$W_d = \sigma * T_d^4 \quad (2)$$

where $T_d$ is the dome temperature, in K (Kelvin)
$W_r$ is the receiver irradiance, in $W.m^{-2}$ $$W_r = \sigma * (T_{case} + K_4 * V_{tp})^4 \quad (3)$$

where
- σ is Stefan-Boltzmann constant=$5.6704*10^{-8}$ $W.m^{-2}.K^{-4}$
- $T_{case}$ is the pyrgeometer's case temperature, in K (Kelvin)
- $K_4$ is the thermopile efficiency factor =0.0007044 $K.uV^{-1}$ Equation 1 is derived from this energy balance equation at the receiver, $$W_{net} = W_{incoming} - W_{outgoing} \quad (4)$$

where $K_0 = 0$ for no blackbody calibration, and, $$W_{net} = K_1 * V_{tp} \quad (5)$$

$$W_{incoming} = W_{atm} + K_3 * (W_d - W_r) \quad (6)$$

$$W_{outgoing} = W_0 = K_2 * W_r \quad (7)$$

When the pyrgeometer device is oriented and its receiver is being cooled as described above with reference to FIG. 4, the right sides of Equations 5 and 7 are the same. However, since the pyrgeometer device has the concentrator installed instead of the dome, as shown in FIGS. 1 and 2, the term $K_3*(W_d-W_r)$ in Equation 6 will equal zero, and $W_{atm}$ is replaced by the following other sources of irradiance: incident irradiance on the thermopile receiver; ambient irradiance on the outside of the concentrator walls; differential irradiance between the ambient irradiance inside the concentrator and the outgoing irradiance from the receiver during the cooling process; and a portion of the outgoing irradiance absorbed by the concentrator's surface and emitted back to the thermopile. Each of these sources of irradiances are discussed below.

The unknown atmospheric irradiance, $W_{atm}$, received at the top port of the concentrator is reflected from the concentrator's inside surface; therefore, the incident portion of $W_{atm}$ on the thermopile receiver equals $_{in}$, where $$W_{in} = \tau * W_{atm} \quad (8)$$

where τ is the concentrator's throughput. In general, a reference detector is used to monitor a stable irradiance. τ is then calculated by dividing the irradiance measured at the thermopile with the concentrator installed by that without the concentrator installed:

$$\tau = \frac{(K_1 * V_{ctp} + K_2 * W_{cr}) * V_{ref}}{(K_1 * V_{tp} + K_2 * W_r) * V_{cref}} \quad (9)$$

Where,
- $V_{ctp}$ and $V_{tp}$ are the thermopile output voltage with and without the concentrator installed, in uV
- $W_{cr}$ and $W_r$ are the receiver irradiance with and without the concentrator installed, in $W.m^{-2}$
- $V_{cref}$ and $V_{ref}$ are the output voltage of the reference detector with and without the concentrator installed, in uV The ambient irradiance outside the concentrator walls, $W_a$, is mostly reflected from the concentrator's outside surface; however, a fraction will be absorbed, conducted through the walls, then emitted from the concentrator's inside surface, and then incident on the thermopile's receiver. This portion of irradiance equals:

$$\epsilon * W_a = \epsilon * \sigma * T_a^4 \quad (11)$$

Where,
- ε is the gold emittance
- $T_a$ is the ambient temperature measured outside the concentrator walls, in Kelvin. Since the concentrator is in equilibrium with ambient, therefore $T_a$ equals the temperature of the concentrator, $T_c$; therefore, Equation 9 yields:

$$\epsilon * W_a = \epsilon * \sigma * T_c^4 \quad (12)$$

where $T_c$ is calculated as the average temperature measured by the thermistors installed in the concentrator's wall.

Another source of irradiance is the differential irradiance between the ambient irradiance inside the concentrator, $W_c$, and the outgoing irradiance from the thermopile receiver, $W_o$, during the cooling process. This differential irradiance will increase in magnitude because $W_c$ is at ambient and $W_o$ is decreased using the temperature controller. This increasing differential signal will be incident and sensed by the thermopile's receiver and will result in a variable voltage signal proportional to the following difference:

$$W_c - W_o = \sigma * T_c^4 - K_2 * W_r \quad (13)$$

A final source of irradiance is the portion from the outgoing irradiance, $W_0$, reflected on the concentrator's inside surface and out to the atmosphere. The portion of $W_0$ that is not reflected will be absorbed by the concentrator's surface, then emitted back and incident on the thermopile's receiver surface. This portion equals:

$$\epsilon * W_0 = \epsilon * K_2 * W_r \quad (14)$$

By adding Equations 8 and 11 through 14, the calculated incoming irradiance in Equation 6 becomes:

$$W_{incoming} = \tau * W_{atm} + (1+\epsilon) * \sigma * T_c^4 + (\epsilon - 1) * K_2 * W_r \quad (15)$$

Therefore, Equation 4 yields:

$$K_1 * V_{tp} = \tau * W_{atm} + (1+\epsilon) * W_c - (2-\epsilon) * K_2 * W_4 \quad (16)$$

Then, the pyrgeometer device's measurement equation to measure the atmospheric long-wave irradiance, $W_{atm}$, is:

$$W_{atm} = \frac{K_1 * V_{tp} + (2-\varepsilon) * K_2 * W_r - (1+\varepsilon) * W_c}{\tau} \quad (17)$$

In addition, as mentioned above with reference to operation 450, the sensitivity of the thermopile of the pyrgeometer device may be calculated from the measurements obtained during operation of the pyrgeometer. More particularly, since $W_{atm}$ is constant, $K_1$ is calculated during the cooling process by differentiating Equation 16 with respect to time, therefore, $$K_1 = \frac{(1-\varepsilon) * \Delta W_c - (2-\varepsilon) * K_2 * \Delta W_r}{\Delta V_{tp}} \quad (18)$$

where $\Delta W_c$, $\Delta W_r$, and $\Delta V_{tp}$ are the differences between the values of each variable measured or calculated at the start and end times of the cooling process. Since $K_2$ equals 1 and E is constant, $K_1$ is calculated and substituted in Equation 17 to calculate the unknown atmospheric long-wave irradiance.

Alternatively, instead of calculating the differences in Equation 18, $K_1$ may be calculated by plotting the changing irradiance versus the changing thermopile output voltage. Since $\tau * W_{atm}$ is constant, the changing net irradiance, $W''_{net}$, from Equation 16 is $$W''_{net} = (1+\epsilon) * W_c - (2-\epsilon) * W_r \quad (19)$$

Figure 5:
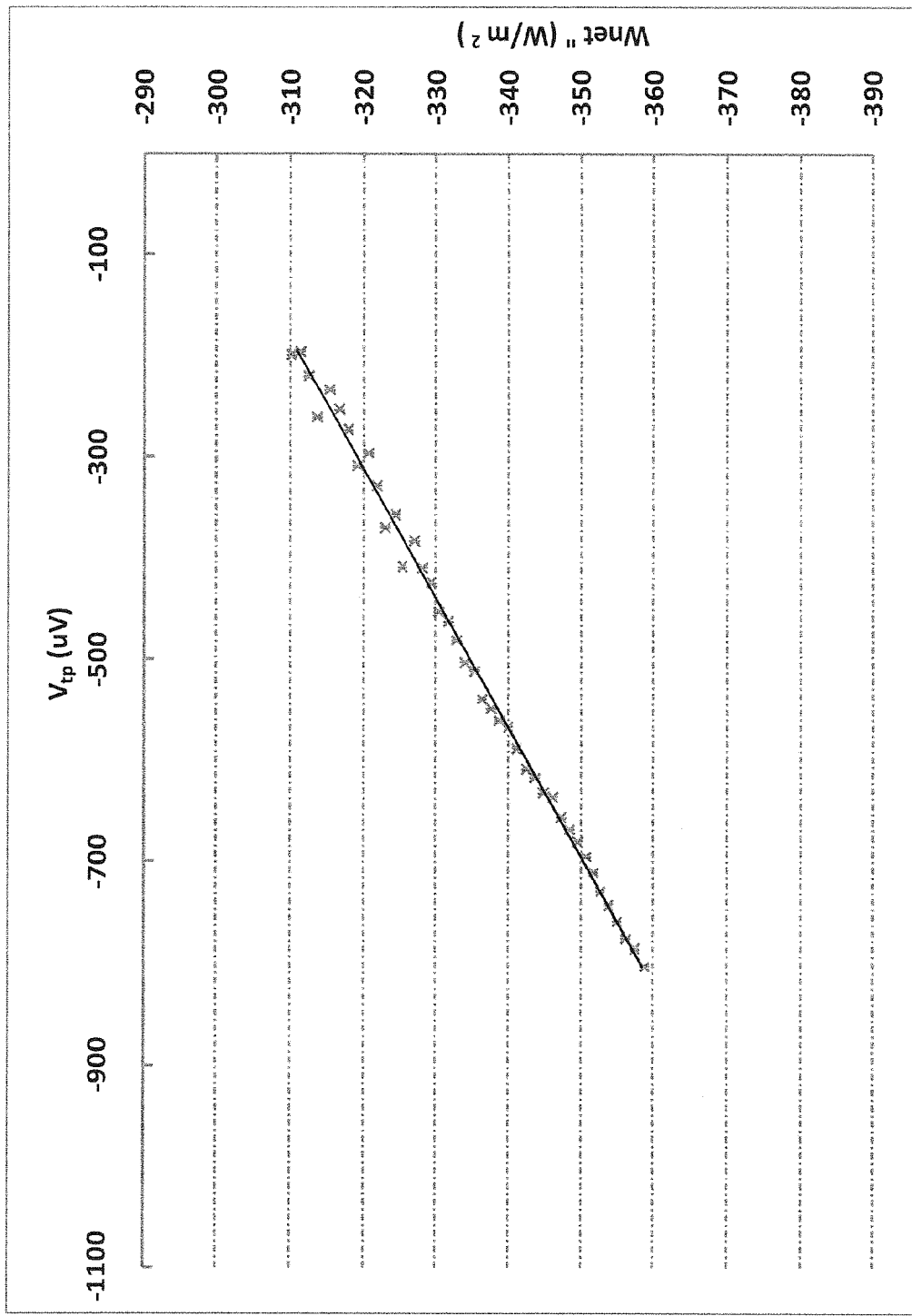
FIG. 5 is a plot of the changing net irradiance versus the changing thermopile output voltage for one measurement session of the absolute cavity pyrgeometer to determine the sensitivity of the thermopile

When $W''_{net}$ is then plotted versus $V_{tp}$; the slope (a) of the straight line fit of the data set (e.g., y=ax+b) would equal $K_1$. For example, FIG. 5 is a plot of the changing net irradiance ($W''_{net}$) versus the changing thermopile output voltage ($V_{tp}$) for one measurement session of the absolute cavity pyrgeometer. The sensitivity $K_1$ for the thermopile used in this measurement session can be determined from the straight line fit of the data set. In addition, the intercept of the straight line fit with the y-axis may also be used to determine $W_{atm}$. More particularly, from Equation 16, the intercept (b) with the $W''_{net}$ axis (y-axis) would equal $-\tau * W_{atm}$; therefore $W_{atm}$ is $$W_{atm} = -\frac{b}{\tau} \quad (20)$$

For example, FIG. 5 is a plot of the changing net irradiance versus the changing thermopile output voltage for one measurement session of the absolute cavity pyrgeometer to determine sensitivity $K_1$.

Figure 6:
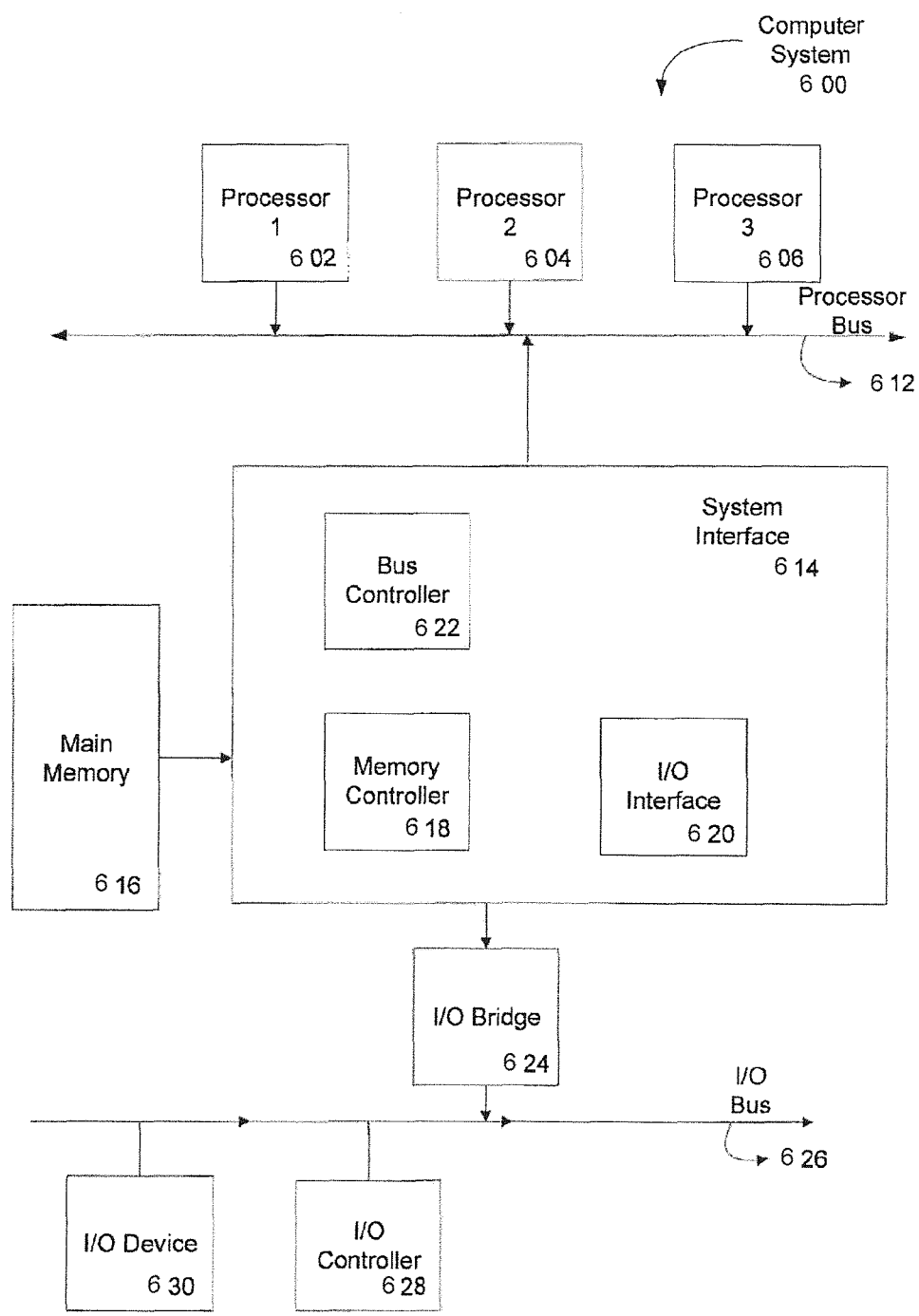
FIG. 6 is a block diagram illustrating an example of a computing device which may be used in implementing embodiments of the present disclosure.

As mentioned above, the methods and operations described herein may be performed by an apparatus or computing device. FIG. 6 is a block diagram illustrating an example of a computing device or computer system 600 which may be used in implementing embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

What is claimed is:

1. An apparatus for measuring atmospheric long-wave irradiance comprising:
a concentrator comprising:
a first irradiance receiving aperture at a first region of the concentrator;
a second aperture at a second region of the concentrator; and
a compound parabolic-shaped chamber with a reflective surface, the first aperture configured to allow atmospheric long-wave irradiance to enter the chamber such that the reflective surface of the chamber reflects long-wave irradiance toward the second aperture of the concentrator;
a thermopile positioned at the second aperture of the concentrator such that at least some of the reflected atmospheric long-wave irradiance strikes the thermopile;
a thermal mass in thermal communication with the thermopile; and
an insulator located between the thermal mass and the concentrator, the insulator configured to reduce thermal communication between the thermal mass and the concentrator.

2. The apparatus of claim 1 further comprising:
a temperature controller in thermal communication with the thermal mass, the temperature controller configured to regulate the temperature of the thermal mass.

3. The apparatus of claim 2 wherein the temperature controller comprises:
a conducting plate in thermal communication with the thermal mass, the conducing plate comprising one or more tubes positioned within the conducting plate;
one or more connecting hoses in fluid communication with the one or more tubes within the conducting plate; and
a temperature controlled fluid flowing through the one or more connecting hoses and the one or more tubes, wherein the temperature controlled fluid varies the temperature of the conducting plate.

4. The apparatus of claim 1 further comprising:
one or more concentrator temperature sensors associated with the concentrator to provide a temperature of the concentrator.

5. The apparatus of claim 1 further comprising:
at least one thermopile temperature sensor in thermal communication with the thermopile to provide the temperature of a reference junction of the thermopile.

6. The apparatus of claim 1 wherein the thermopile comprises a receiving surface, the receiving surface at least partially colored.

7. The apparatus of claim 1 wherein the concentrator further comprises a cylindrical-shaped outer surface, and wherein the chamber and the outer surface of the concentrator are gold plated.

8. The apparatus of claim 6 wherein the thermopile is configured to convert atmospheric long-wave irradiance striking the receiving surface into a reference voltage from which the atmospheric long-wave irradiance is determined.

9. A method for measuring the absolute atmospheric long-wave irradiance comprising:
orienting an absolute cavity pyrgeometer to receive and measure atmospheric long-wave irradiance, the absolute cavity pyrgeometer comprising at least a concentrator, a thermopile and a temperature controller in thermal communication with the thermopile;
cooling the thermopile by lowering a temperature of the temperature controller;
obtaining one or more measurements from the absolute cavity pyrgeometer;
calculating the sensitivity of the thermopile from the one or more measurements from the absolute cavity pyrgeometer; and
calculating the atmospheric long-wave irradiance from the one or more measurements from the absolute cavity pyrgeometer and the calculated sensitivity of the thermopile.

10. The method of claim 9 further comprising:
monitoring one or more long-wave irradiance detectors to determine the stability of the atmospheric long-wave irradiance.

11. The method of claim 9 further comprising:
transmitting the one or more measurements to a computing device; and
storing the one or more measurements in a computer-readable medium.

12. The method of claim 9 wherein the cooling operation comprises:
cooling a fluid associated with the temperature controller; and
circulating the fluid through a conductor plate in thermal communication with the thermopile.

13. The method of claim 9 wherein the one or more measurements from the absolute cavity pyrgeometer have traceability to the International System of Units (SI).

14. The method of claim 9 wherein the one or more measurements comprise:
a temperature of the concentrator;
a temperature of the thermopile; and
a voltage output of the thermopile.

15. The method of claim 9 further comprising:
calibrating one or more pyrgeometer devices to the absolute cavity pyrgeometer to create an international standard for pyrgeometer calibration based on the absolute cavity pyrgeometer.

16. A system for measuring absolute atmospheric long-wave irradiance comprising:
a computing device comprising:
a processor in communication with a computer-readable medium; and
an absolute cavity pyrgeometer comprising:
a thermopile configured to detect atmospheric long-wave irradiance and to output a voltage related to the detected atmospheric long- wave irradiance to the computer-readable medium of the computing device;
a concentrator configured to reflect atmospheric long-wave irradiance to the surface of the thermopile;
a temperature controller in thermal communication with the thermopile configured to control the temperature of at least one surface of the thermopile;
one or more thermistors associated with the concentrator configured to provide temperature information of the concentrator to the computer-readable medium of the computing device; and
one or more temperature sensors associated with the thermopile configured to provide temperature information of the thermopile to the computer-readable medium of the computing device.

17. The system of claim 16 wherein the absolute cavity pyrgeometer further comprises:

one or more long-wave irradiance detectors configured to determine the stability of the atmospheric long-wave irradiance and provide stability information to the computer-readable medium of the computing device.

18. The system of claim 17 wherein the processor of the computing device is configured to:
obtain the thermopile output voltage, the temperature information of the concentrator, the temperature information of the thermopile and the stability information from the computer-readable medium;
calculate the sensitivity of the thermopile; and
calculate the atmospheric long-wave irradiance detected by the absolute cavity pyrgeometer.

* * * * *